United States Patent [19]

Cantoni

[11] Patent Number: 4,779,456
[45] Date of Patent: Oct. 25, 1988

[54] DEVICE FOR VISUALLY CHECKING THE DEGREE OF CLOGGING OF AN AIR FILTER IN MOTOR VEHICLE ENGINES

[75] Inventor: Angelo Cantoni, Rome, Italy

[73] Assignee: Ital Idee s.r.l. an Italian Limited Liability Company, Rome, Italy

[21] Appl. No.: 34,927

[22] Filed: Apr. 6, 1987

[30] Foreign Application Priority Data

Apr. 7, 1986 [IT] Italy .............. 35704/86 [U]

[51] Int. Cl.⁴ .......................................... G01M 19/00
[52] U.S. Cl. ...................................... 73/118.1; 55/274
[58] Field of Search ............ 73/118.1; 116/DIG. 25, 116/276; 55/274; 123/26, 198 E

[56] References Cited

U.S. PATENT DOCUMENTS

| | | | |
|---|---|---|---|
| 2,655,894 | 10/1953 | Rabbitt | 116/DIG. 25 |
| 3,060,527 | 12/1962 | Sten | 73/118.1 |
| 3,246,624 | 4/1966 | Lowther | 73/118.1 |
| 3,591,945 | 7/1971 | Eisel | 55/274 |
| 4,162,660 | 7/1979 | Albertson et al. | 116/DIG. 25 |
| 4,509,613 | 4/1985 | Yamaguchi | 55/274 |
| 4,548,166 | 10/1985 | Gest | 123/198 E |
| 4,561,395 | 12/1985 | McMullen | 184/6.24 |

*Primary Examiner*—Stewart J. Levy
*Assistant Examiner*—Robert R. Raevis
*Attorney, Agent, or Firm*—Fleit, Jacobson, Cohn & Price

[57] ABSTRACT

The device for visually checking the degree of clogging of an air filter in motor vehicle engines according to the invention comprises a tubular duct closed at one end and provided with a wall of filter material communicating with an outlet pipe connectable to the engine combustion air intake manifold downstream of the filter, in the side walls of the tubular duct there being provided at least one transparent region opposite the filter material wall and arranged to allow the surface of the filter material wall to be viewed, the tubular duct being in communication with the external environmental from which the air is drawn.

9 Claims, 1 Drawing Sheet

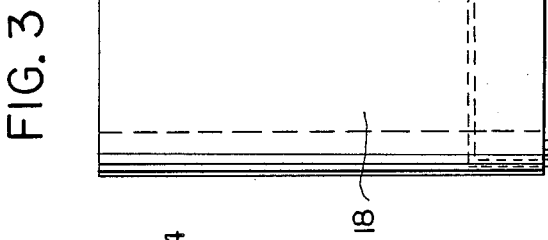
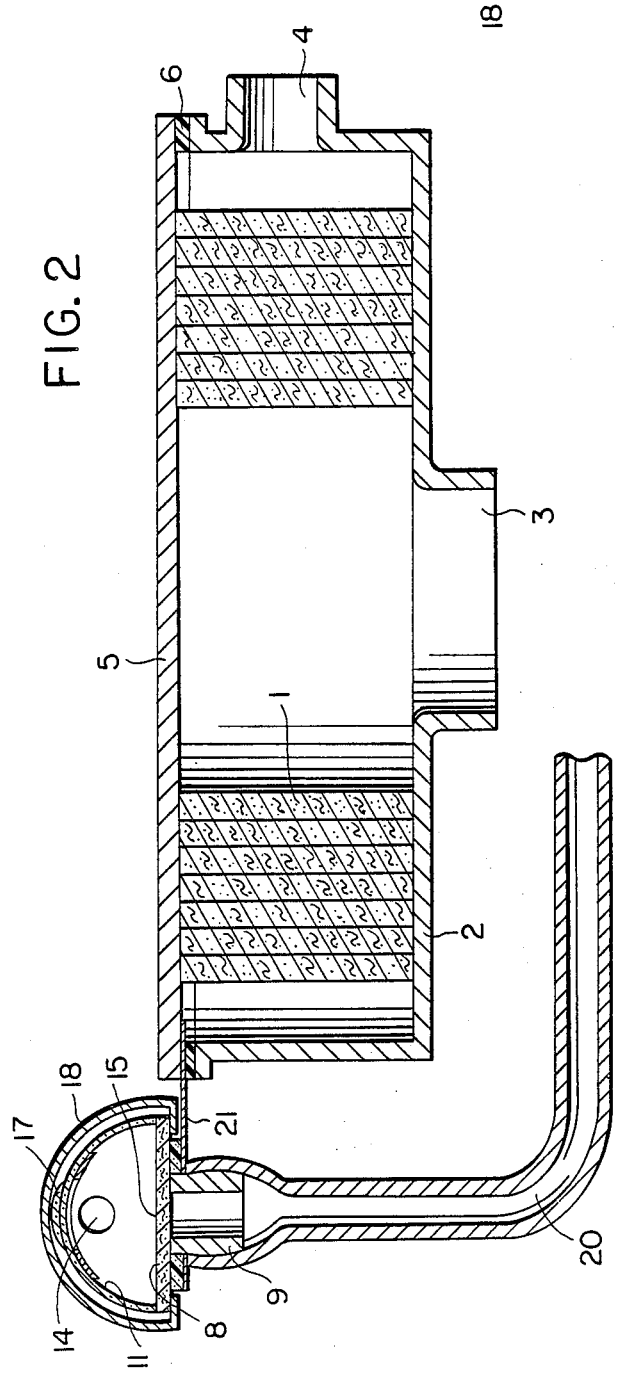
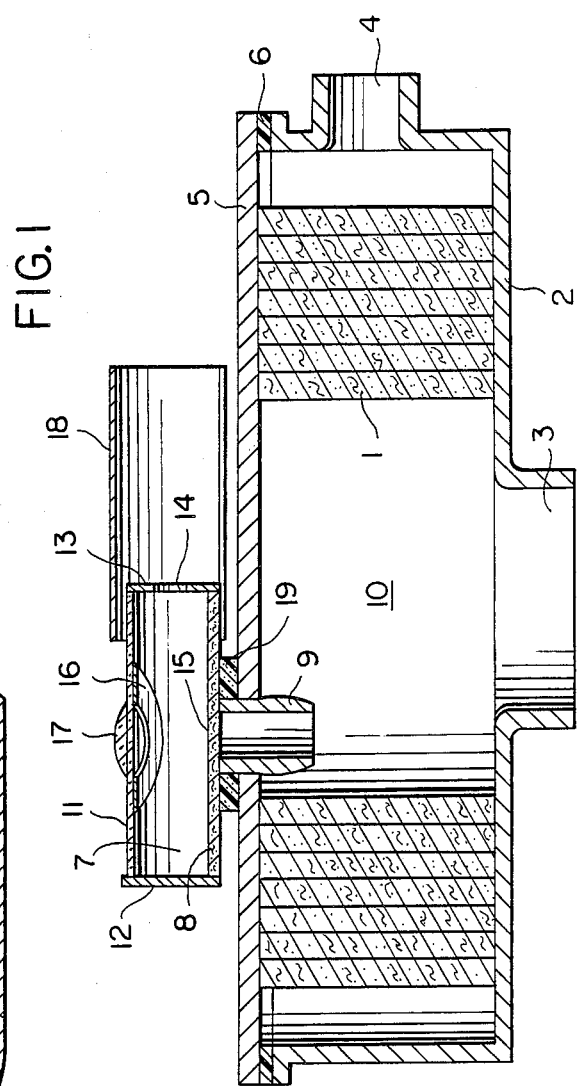

DEVICE FOR VISUALLY CHECKING THE DEGREE OF CLOGGING OF AN AIR FILTER IN MOTOR VEHICLE ENGINES

BACKGROUND OF THE INVENTION

This invention relates to a device for visually checking the degree of clogging of an air filter in motor vehicle engines.

The internal combustion engines of motor vehicles and the like require the intake of a considerable quantity of air for their operation, this being necessary for the combustion process.

However, atmospheric air contains a large quantity of solid particulate of various kinds, which if drawn in together with the air can cause serious damage to the engine.

These engines are therefore provided at the combustion air inlet mouth with a filter able to retain a large part of the solid particulate without substantially hindering air passage, because of its large filtering surface.

However, with the passage of time these filters are subject to progressive clogging due to the deposition of filtered material on their surface, and therefore after a certain period of use offer a resistance to air passage which is no longer negligible. The result of this is an unbalance in the engine feed, with consequent non-optimum engine operation.

This clogging cannot be currently measured reliably, it being determined either by an approximate visual evaluation of the filter after removing it from its housing, or by a fixed period of filter use, but which does not take account of the variable engine utilization conditions and the consequent different degree of filter clogging.

The problem therefore arises of providing a device for checking the degree of clogging of the filter which allows reliable monitoring of the filter efficiency without having to remove it from its seat.

SUMMARY OF THE INVENTION

These results are attained according to the present invention by a device for visually checking the degree of clogging of an air filter in motor vehicle engines, which consists of a tubular duct closed at one end and provided with a wall of filter material communicating with an outlet pipe connectable to the engine combustion air intake manifold downstream of the filter, in the side wall of the tubular duct there being provided at least one transparent region opposite the filter material wall and arranged to allow the surface of the filter material wall to be viewed, the tubular duct being in communication with the external environment from which the air is drawn.

Conveniently, the tubular duct consists of a semicylindrical duct in which the flat wall is formed from filter material and the adjacent cylindrical wall is formed from transparent material, the outlet pipe being directly connected to the filter material wall and defining therein a region traversed by the air flow which is drawn through the device by the vacuum produced by the engine downstream of the filter.

That surface of the filter material wall which faces the interior of the tubular duct is provided with coloration in the form of contrasting colours to allow simpler observation of its soiled state. The transparent wall facing the filter material wall is conveniently provided with a region having coloration corresponding to the coloration of the filter material wall when this is clean, in order to allow comparison with the coloration of this wall after a period of use of the device in association with the air filter.

Preferably, that region of the surface of the transparent wall provided with coloration has a chromatic scale corresponding to successive degree of soiling of the filter material wall, so as to allow easy evaluation of the state of effectiveness of the filter by comparison.

The transparent wall comprises a magnifying lens in correspondence with that region of the filter material wall traversed by the air flow. This lens is conveniently located on the transparent wall in a position which displays that region of the filter material wall traversed by the air flow when this is viewed from a convenient angle in relation to the position in which the device is located in the engine.

An opaque dirt protection cap is disposed over the transparent material wall.

At that end of the tubular duct distant from the closed end there is provided a wall with a hole of such a size as to allow air to pass through the filter material wall analogously to its passage through the filter.

The outlet pipe can be directly inserted into the cover of the casing housing the combustion air filter, in communication with the chamber downstream of the filter, or alternatively, in relation to the engine structure, said outlet pipe can be connected by a pipe to a region of the engine combustion air intake manifold downstream of the filter, the tubular duct being connected to the casing housing the air filter.

DESCRIPTION OF THE DRAWINGS

Further details will be apparent from the description given hereinafter with reference to the accompanying drawings in which:

FIG. 1 is a section through an air filter provided with a clogging indicator device according to the invention, FIG. 2 shows an air filter with the clogging indicator device located differently, and FIG. 3 is a view of the indicator device from above.

DETAILED DESCRIPTION

As shown in FIG. 1, an internal combustion engine air filter 1 is housed in a casing 2 connected by the connector 3 to the engine air intake manifold and provided with an air inlet port 4. The casing 2 is closed upperly by a cover 5 provided with a seal gasket 6, which clamps the filter 1 against the base surface of the casing 2 to allow the air drawn in by the effect of the vacuum in the engine intake manifold to pass only through the filtering surface of the filter.

The indicator device according to the invention consists of a substantially semicylindrical tubular duct 7, the flat base wall 8 of which is formed of a filter material and communicates by way of an outlet pipe 9 with the internal filter chamber 10 in which the vacuum produced by the engine intake exists.

The upper wall 11 of the tubular duct 7 consists of transparent material able to allow the inner surface of the filter material wall 8 to be viewed. The end wall 12 is closed, whereas the opposite wall 13 comprises a hole 14 for the entry of air into the device, and in communication with the external environment.

The intake air can pass through the wall 8 only in correspondence with the inner bore of the pipe 9, in the region indicated by 15 in the figure. This region is therefore subject to progressive deposition of solid particles in the same manner as the filtering surface of the filter 1 becomes clogged, these particles causing an alteration in the original color of the inner surface of the wall 8, which can be viewed through the transparent wall 11 to provide a visual indication of the degree of soiling undergone by the said wall and by the filter 1.

In order to facilitate recognition of the degree of soiling of the region 15 of the wall 8, the transparent wall 11 is provided with a ring 16, most visible in FIG. 3, formed from adhesive material, paints or the like, to reproduce the original appearance of the surface of the region 15 of the wall 8, or alternatively a scale of successive colorations assumed as clogging progresses, so as to allow comparison with the current state of the surface of the region 15.

That surface of the wall 8 lying inside the duct can be provided with a coloration which reproduces intense color lines or designs contrasting with the background color, so that the progressive difficulty in distinguishing these chromatic motifs on the surface of the region 15 gives a clear indication of its state of clogging.

To facilitate the reading of said region 15 on the wall 11, a magnifying lens 17 can be located in the center of the ring 16 to allow a magnified view of the area subject to soiling.

The diameter of the hole 14 is chosen such that the quantity of air traversing the surface of the region 15 during a given time corresponds to the quantity of air traversing the filter 1 during the same period, so that the clogging of the passage region 15 of the wall 8 corresponds to analogous clogging of the filter 1.

In order to protect the transparent wall 11 from dust, dirt and the like which would compromise its transparency, so making viewing and comparison difficult, a slidable opaque cap 18 is provided on it, and is usually left over the wall 11 resting against the end wall 12, to be slid laterally into the position shown in FIG. 1 when checking.

The indicator device according to the invention can be mounted, as shown in FIG. 1, by inserting the pipe 9 into a hole in the cover 5, by way of a sponge gasket 19 for sealing and vibration-damping purposes, or, as shown in FIG. 2 in which the device according to the invention is illustrated in cross-section, the outlet pipe 9 can be connected by means of an extension pipe 20 to a point in the combustion air intake manifold downstream of the air filter, for example by connecting it into the engine oil vent gas draw-off pipe, which is under vacuum and opens into the combustion air intake manifold.

In this case, the device can be fixed to the cover 5 of the casing housing the filter by means of a lug 21 of deformable material, to be inserted under the edge of the cover when this is closed after replacing the filter 1.

To facilitate viewing of that area 15 of the wall 8 subject to soiling, in relation to the structure of the engine and the arrangement of the filter in it the lens 17 and the colored ring 16 which surrounds it can be disposed in such a position as to allow visual alignment between the lens and the region 15 from a position which is comfortable for checking purposes, for example it can be aligned with the region 15 along an observation line inclined at 45°.

What is claimed is:

1. A device for visually checking the degree of clogging of an air filter in motor vehicle engines, characterized by
   a hollow duct closed at one end,
   filter material defining one wall of said hollow duct,
   an outlet pipe connectable to an engine combustion air intake manifold downstream of the air filter,
   at least one transparent region being provided in said hollow duct opposite the one wall and arranged to allow the surface of the filter material defining the one wall to be viewed, the hollow duct being in communication with the external environment from which air is drawn so that the air passes from the external environment through said air filter into said engine combustion intake manifold and simultaneously from the external environment into said hollow duct, through said filter material, and through said outlet pipe into said engine combustion intake manifold, characterized in that the hollow duct is a semicylindrical duct in which said one wall is formed from flat filter material and in which an adjacent semicylindrical wall is formed from transparent material, the outlet pipe being directly connected to the one wall and defining therein a region traversed by the air which is drawn from the external environment through the device by the vacuum produced by the engine downstream of the filter.

2. A device according to claim 1, characterized in that a surface of the filter material wall faces the interior of the tubular duct and is provided with coloration in the form of contrasting colors.

3. A device according to claim 1, characterized in that the surface of the semicylindrical wall is provided with a region having coloration corresponding to color of the one wall formed from flat filter material when said one wall is clean, in order to allow visual comparison between said region having coloration and said one wall formed from flat filter material after a period of use of the device in association with the air filter.

4. A device according to claim 3, characterized in that the region having coloration has a chromatic scale corresponding to successive degrees of soiling of the one wall formed from flat filter material.

5. A device according to claim 4, characterized in that the semicylindrical wall includes a magnifying lens in correspondence with that region of the one wall formed from flat filter material traversed by the air.

6. A device according to claim 5, characterized in that the lens is located on the semicylindrical wall in a position which displays that region of the one wall traversed by the air when viewed from an angle in relation to the position in which the device is located in the engine.

7. A device according to claim 6, characterized in that an opaque dirt protection cap is disposed over the semicylindrical wall.

8. A device according to claim 7, characterized in that at that end of the hollow duct distant from the closed end there is provided a wall with a hole of such a size as to allow similar quantities of air to pass through the wall formed from filter material and through the air filter.

9. A device comprising:
   a closed casing including an air inlet port and an air outlet port;
   an air filter housed in said casing and disposed between said air inlet port and said air outlet port;
   a connector forming said air outlet port and connecting said casing to an engine intake manifold;
   an indicator device, said indicator device including a base wall formed of a filter material;

an upper wall of transparent material;
said base wall and said upper wall together forming a hollow duct;
means closing one end of said hollow duct;
means including a hole partially closing an opposite end of said hollow duct;
an outlet pipe having a first end, a second end, and an inner bore, the first end of said outlet pipe connected to and extending away from said base wall of said hollow duct, the second end of said outlet pipe connected to the engine intake manifold downstream of said air filter, the inner bore of said outlet pipe defining an outer circumference of a region of said filter material through which air passes;

wherein air is drawn through said inlet port into said casing, through said air filter, and through said outlet port by a vacuum produced in said engine intake manifold, the vacuum simultaneously drawing air through said hole into said hollow duct, through said hollow duct, through said region of said filter material and through said outlet pipe so that solid particles in the air drawn through said hole are retained by said region and can be viewed through said upper wall of transparent material to provide a visual indication of the degree to which said filter is soiled

* * * * *